United States Patent [19] [11] 4,055,517
Daimer [45] Oct. 25, 1977

[54] PROCESS FOR PRODUCING WATER-SOLUBLE ORGANIC MACROMOLECULES, AND THE WATER-SOLUBLE ORGANIC MACROMOLECULES OBTAINED

[75] Inventor: Wolfgang Daimer, Graz, Austria

[73] Assignee: Vianova Kunstharz A.G., Vienna, Austria

[21] Appl. No.: 607,910

[22] Filed: Aug. 26, 1975

[30] Foreign Application Priority Data

Aug. 27, 1974 Austria .................................. 6924/74

[51] Int. Cl.$^2$ ............................................. C08G 59/14
[52] U.S. Cl. ......................... 260/2 EP; 260/29.2 EP; 260/29.2 E; 260/29.2 UA; 260/29.6 PM; 260/47 EP; 260/75 T; 526/57
[58] Field of Search ................. 526/57; 260/29.2 EP, 260/47 EP, 2 EP, 29.6 PM, 77.5 AQ, 29.2 TN, 75 T, 29.2 E, 29.2 UA

[56] References Cited

U.S. PATENT DOCUMENTS

| | | | |
|---|---|---|---|
| 2,749,349 | 6/1956 | Aslak | 260/290 |
| 3,159,611 | 12/1964 | Dunn et al. | 526/57 |
| T926,001 | 9/1974 | Brack | 260/858 |

FOREIGN PATENT DOCUMENTS 1,097,450  1/1968  United Kingdom .................. 526/57

*Primary Examiner*—Eugene C. Rzucidlo
*Attorney, Agent, or Firm*—A. W. Breiner

[57] ABSTRACT

Water-soluble organic macromolecules having a chemical structure juxtapositioned between nonionic macromolecules and macromolecules with polyelectrolyte structure are prepared by reacting water-insoluble macromolecules carrying tertiary substituted basic nitrogen atoms with a material which will release oxygen. The macromolecules, rendered water soluble through the presence of a plurality of semi-polar linkages between nitrogen and oxygen atoms, are useful as binders in water-dilutable paint systems, surface-active wetting agents, flocculating aids as, for example, in treatment of waste water, and the like.

10 Claims, No Drawings

PROCESS FOR PRODUCING WATER-SOLUBLE ORGANIC MACROMOLECULES, AND THE WATER-SOLUBLE ORGANIC MACROMOLECULES OBTAINED

The present invention is directed to organic macromolecules. More particularly, the invention is directed to water-soluble macromolecules containing as the water-solubilizing imparting entity a semi-polar linkage between nitrogen and oxygen atoms. The semi-polar linkage is formed by the reactiion of a macromolecule containing tertiary substituted nitrogen atoms with a substance, such as a hydrogen peroxide, splitting off or releasing oxygen.

Water-soluble organic macromolecules have an immense importance in the chemical industry as surface-active wetting agents, as flocculating aids in the treatment of waste water, as additives in hydraulic systems, as lubricants, as well as binders in water-dilutable paint systems.

The water-soluble organic macromolecules heretofore known are, according to their chemical structure, either nonionic macromolecules or macromolecules with polyelectrolytic structure. The non-ionic macromolecules are rendered water soluble by incorporation of a large number of oxygen atoms having an ether-like linkage, e.g., as orignated in the reaction of phenols or alcohols with preferably ethylene oxide or propylene oxide. The macromolecules with polyelectrolyte structure form colloidal or true solutions with water. They carry a great number of salt-like groups in the macromolecule and, according to charge, are either macropolyanions or macropolycations. The macropolyanions most always are characterized by the exclusive presence of carboxylate or sulfonate groups. The counter ions usually are alkali cations, ammonia, or amine cations. Accordingly, the macropolycations carry basic nitrogen atoms in the macromolecule which are neutralized by organic or inorganic acids.

The present invention provides a third group of water-soluble organic macromolecules, which according to their chemical structure have a juxtaposition between nonionic maromolecules and macromolecules with polyelectrolyte structure. They become water soluble, not through oxygen to ether-like linkages or through salt-like polyelectrolyte structure, but through a semi-polar linkage between nitrogen and oxygen atoms.

In the literature (Houben-Weyl, Muller, Methoden der organischen Chemie, Bd. 11/2, Seite 199, 4. Auflage, Georg Thieme Verlag, Stuttgart) it is known that low molecular tertiary amines can be transformed to amine oxides (or N-oxides) by treating the amines with hydrogen peroxide. The compounds are said to be water soluble. It has now been found that water-insoluble macromolecules carrying a large number of tertiary nitrogen atoms can be transformed into water-soluble substances by this same reaction.

The process of the invention is characterized in that water-insoluble macromolecules, carrying at least about 1 mole of tertiary substituted basic nitrogen atoms in 1,000 g of substance, are reacted at 0° to 150° C. with at least as much of a substance splitting off oxygen, preferably hydrogen peroxide, so that more than 0.95 moles of amine oxide in 1,000 g of substance are formed. Through the semi-polar character of the linkage in the formed amine oxides the macromolecule attains excellent solubility in water. If polar groups are still present, they need not be neutralized before use of the macromolecules.

Many methods and many raw materials can be used to introduce basic tertiary nitrogen atoms into macromolecules. The following gives an incomplete summarizing survey for various ways of their synthesis:

A. Addition reaction of epoxy groups and secondary amines.

Important raw materials carrying epoxy groups having structures according to general formula I

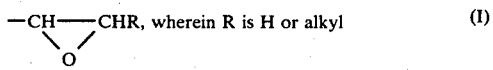

are the glycidyl ethers of phenols, particularly of 4,4'-bis(hydroxyphenyl-propane (Bisphenol A). Other compounds are glycidylethers of phenol-formaldehyde condensates of the novolak type, glycidyl esters of aliphatic mono- or dicarboxylic acids, glycidyl ethers of aliphatic diols, copolymers of glycidyl(meth)acrylate or epoxidation compounds of aliphatic or alicyclic olefins. An extensive description of these compounds can be found in A. M. Paquin, Epoxidverbindungen und Epoxyharze, Verlag Springer, 1958.

Secondary amines suitable for addition to epoxy groups are, for example, dimethyl amine, diethyl amine or higher homologues or isomers thereof. Secondary alkanol amines are also suitable, e.g., diethanol amine, diisopropanol amine and higher homologues or isomers thereof. Furthermore, cyclic secondary amines, e.g., ethylene imine, morpholine, and piperidine, can be employed.

The weight ratios of the two reactants can be varied within wide limits, as long as sufficient basic tertiary nitrogen atoms are formed to impart a water-soluble macromolecule upon subsequent formation of the amine oxide. An excess of secondary amine is, in general, not desirable since it does not participate in the formation of the desired macromolecule.

B. Substituted oxazoline compounds.

These compounds are formed through cyclizing condensation of amine alcohols such as 2-amino-2-hydroxymethyl-1,3-propane diol, with aliphatic carboxylic acids. A comprehensive illustration of these oxazolines is given by J. A. Frump, Chemical Reviews, 1971, Vol. 71, No. 5, p. 483 – 505.

C. Reaction of N-tertiary substituted amine alcohols with polycarboxylic acids or polyisocyanates.

An example of this class of compound is the reaction product of 2 moles of N,N-dimethylethanol amine with 1 mole of toluene diisocyanate.

D. Re-esterification of ester side groups of a macromolecule with only slightly volatile N-tertiary substituted alkanol amines.

The preferred ester side groups for use in preparing this class of materials are the low molecular aliphatic alcohols. For instance, an ethylacrylate polymer is transformed by re-esterification at elevated temperature with N,N-dimethyl ethanol amine through splitting off of ethanol into a polymer carrying tertiary basic nitrogen atoms.

E. Condensation of anhydride forming dicarboxylic acids with diamines.

In the reaction forming this class of compounds one of the nitrogen atoms is a primary substituted atom, and other is a tertiary atom. An example of such an amine is N,N-diethyl-1,3-propane diamine. Suitable anhydride forming dicarboxylic acids are, e.g., o-phthalic acid and maleic acid, and also the adducts of maleic anhydride with unsaturated oil fatty acids or their esters, or the adducts of maleic anhydride to oligomeric polyenes, e.g., the oligomers of butadiene or of pentadiene. Through condensation of the primary amine group with the dicarboxylic acid or its anhydride, a substituted acid imide is formed which still carries tertiary basic nitrogen atoms.

Macromolecules containing tertiary substituted nitrogen atoms prepared by any of the preceding methods, or other methods, can be used according to this invention. The essential characteristic is that the macromolecules as known in the art, have a molecular weight sufficiently high to perform as a surface-active wetting agent, or as a binder in a water-dilutable paint system, or the like, and that at least about 1 mole of tertiary substituted basic nitrogen atoms are present for each 1,000 grams of macromolecular substance. Macromolecules generally have a molecular weight of from about 400 to 20,000. For the present invention, the preferred molecular weight is from about 600 to 10,000.

According to the present invention, the organic macromolecules carrying tertiary nitrogen atoms are reacted with a material which splits off oxygen. The preferred substance is hydrogen peroxide in aqueous solution at any desired degreee of concentration. Other suitable substances are per-oxo-acids like peroxo acetic acid or peroxobenzoic acid, ozone, etc. Reaction conditions for the polymer, analogous amine oxide formation, can be varied within wide limits. The reaction temperature may range from 0° to 150° C., in the presence of ester linkages subject to easy saponification, lower reaction temperatures are preferred. Inert solvents in order to dilute the macromolecules can be coemployed but are unnecessary in most cases.

For sufficient water solubility of macromolecules formed according to the present invention, in general a minimum of 0.95 moles of amine oxide structures in 1,000 g of non-volatile reaction mass is required. The level of tertiary nitrogen atoms should accordingly not be below 1 mole in 1,000 g of substance. When using equimolar quantities of oxygen-freeing or releasing substance of tertiary nitrogen atoms, total and clear solubility in water is obtained in most cases before the peroxide is totally consumed. In such cases it is possible either to use a reduced quantity of peroxide or to react the excess peroxide with a reducing substance, e.g., formic acid. The essential characteristic is that sufficient oxygen-releasing agent be present to react with the tertiary substituted nitrogen atom to provide at least about 0.95 moles of amine oxide in 1,000 g of macromolecular substance. The concentration and amount of oxygen-releasing substance beyond such characteristic is not particularly critical.

The following examples illustrate the principles of the invention, applied to some of the above-mentioned groups of macromolecules with tertiary nitrogen atoms.

EXAMPLE 1

At 80° C. 186 g of a bisphenol diglycidyl ether with an epoxy equivalent weight of 186 – 192 (Dow Epoxi Resin 331) are continously added over the period of an hour to 133 g (1 mole) of diisopropanol amine. When the exothermic reaction has subsided, the viscosity of a resin sample, diluted with ethylene glycol monoethyl ether to 55 percent solids, is K, Gardner-Holdt. At this phase the resin is insoluble in water, unless the basic groups are neutralized with an acid.

Thereafter, to 319 g of the above reaction product, 113 g (1 mole) of a 30 percent solution of hydrogen peroxide are added at 60° – 100° C. within 1 hour. The reaction is slightly exothermic. 30 minutes after the addition, the resin can be readily dissolved with water to any desired degree to give a clear solution without neutralization. The pH-value of the solution is 7.05. The coemployment of auxiliary organic solvents is not necessary. If a 1-n acid or base is added to the clear aqueous solution, the appearance remains unchanged. Higher salt concentrations, however, lead to precipitates.

EXAMPLE 2

100 g of N,N-diethylaminoethylacrylate are mixed with 3 g of azodiisobutyronitrile. One-third of the blend is charged to a reaction vessel equipped with stirrer and reflux condensor and is heated to 80° C., the polymerization commencing with exothermic reaction. The remaining two-thirds of the blend are added continuously over 1 hour. In the course of the reaction, the temperature will rise to 140° C. The polymerization is carried to a solids content of 90 percent through further addition of 2 g of azodiisobutyronitrile. The acid number of the product is 20 mg KOH/g. At this stage the resin is insoluble in water, unless the basic groups are neutralized with an acid. The temperature is lowered to 20° C. and 250 g of distilled water are added to the batch. To the opaque batch, 250 g of a 30 percent solution of hydrogen peroxide are continuously added within 1 hour at 30° C. In the course of the reaction, the opaque mass becomes clear and completely dilutable with water. The acid value of the resin is 21 mg KOH/g, and the pH-value of the aqueous solution is 7.0.

EXAMPLE 3

At 60° C., 150 g of triethylene glycol (1 mole) an 178 g of N,N-dimethylethanol amine (2 moles) are slowly reacted with 348 g of toluene diisocyanate (isomer blend of 2,4- and 2,6-toluene diisocyanate, 2 moles altogether) while stirring. The exothermic reaction raises the temperature to 100° C. At this phase the resin is insoluble in water, unless the basic groups are neutralized with an acid.

According to the invention, at 70° C., 220 g of a 30 percent solution of hydrogen peroxide are added within 2 hours. 15 minutes after the end of the addition, the resin can be clearly diluted with water to any desired degree without any neutralizing agent. The coemployment of auxiliary organic solvents is not necessary. The pH-value of the aqueous solution is about 8.

EXAMPLE 4

300 g of linseed oil and 100 g of maleic anhydride are reacted at 200° C. under inert gas atmosphere, until after about 5 hours no free maleic anhydride can be traced. At 120° C., 130 g of N,N-diethyl-1,3-propane diamine

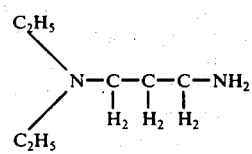

are slowly added, then the batch is reheated to 170° C. and held at this temperature for 2 hours. With the separation of water, the primary amine group reacts to an imide group. The obtained reaction product has an acid value of 15 mg KOH/g and is insoluble in water, unless the basic groups are neutralized with an acid, e.g., lactic acid. The obtained reaction product is reacted at 60° C. with 110 g of a 30 percent solution of hydrogen peroxide. After one hour of reaction the resin can be diluted with water to any desired degree without neutralization to provide a clear solution. The pH-value of the aqueous solution is 6.5. The coemployment of auxiliary organic solvents is not necessary.

In the above examples, the macromolecule can be replaced with any other macromolecule as long as it contains the essential amount of tertiary substituted basic nitroen atoms. Additionally, the oxygen-releasing agent can be replaced by other oxygen-releasing agents, the concentration and the amount not being particularly critical as long as sufficient of the oxygen-releasing agent is present to provide at least about 0.95 mole of amine oxide per 1,000 g of macromolecular substance.

The water-soluble macromolecular materials prepared in accordance with Examples 1 through 4 can be utilized, with advantage, as binders in a water-dilutable paint system; as surface-active wetting agents; as flocculating aids in the treatment of waste water, or in other applications known in the art for ater-soluble macromolecules. Since the chemical structure of the macromolecules of this invention are juxtapositioned between nonionic macromolecules and macromolecules with polyelectrolyte structure, they offer unique advantages in each of the aforesaid applications, While specific examples of this invention have been set forth, it will be apparent to one skilled in the art that various modifications can be made in the presently defined invention without departing from the scope of the inventive concept as set out in the appended claims.

It is claimed:

1. Process for producing water-soluble organic macromolecules comprising reaction at a temperature of from about 0° to 150° C. a water-insoluble reaction product selected from the group consisting of
   a. a polyepoxide and a secondary amine;
   b. a polymer containing ester groups and a low volatile N-tertiary substituted alkanol amine; the reaction product carrying at least one mole of tertiary substituted basic nitrogen atoms in 1,000 g of macromolecular substance and having a molecular weight from about 400 to 20,000, with a substance which will split off oxygen and continuing the reaction until the macromolecular substance is water soluble.

2. The process of claim 1 wherein the said reaction product has a molecular weight of from about 600 to 10,000.

3. The process of claim 1 wherein the reaction is continued until at least about 0.95 moles of amine oxide is formed per 1,000 g of macromolecular substance.

4. The process of claim 1 wherein the substance for splitting off oxygen is hydrogen peroxide.

5. The process of claim 1 wherein the substance for splitting off oxygen is a peroxo acid.

6. The process of claim 1 wherein the substance for splitting off oxygen is ozone.

7. The process of claim 1 wherein the reaction is carried out in the presence of water.

8. The process of claim 1 wherein the macromolecular substance is the reaction product of a polyepoxide and a secondary amine.

9. A water-soluble organic macromolecule comprising the reaction product prepared by reacting at a temperature of from about 0° to 150° C. a water-insoluble macromolecular reaction product selected from the group consisting of
   a. a polyepoxide and a secondary amine;
   b. a polymer containing ester groups and a low volatile N-tertiary substituted alkanol amine;
the reaction product carrying at least one mole of tertiary substituted basic nitrogen atoms in 1,000 g of macromolecular substance and having a molecular weight from about 400 to 20,000, with a substance which will split off oxygen, the reaction being continued until the macromolecular substance is water soluble.

10. The water-soluble organic macromolecule of claim 9 wherein the said reaction product has a molecular weight of from about 600 to 10,000.

* * * * *